(12) United States Patent
Smith

(10) Patent No.: US 6,739,066 B2
(45) Date of Patent: *May 25, 2004

(54) LEVEL ADJUSTING APPARATUS FOR A POWER TOOL

(75) Inventor: Darrin Eugene Smith, Ontario (CA)

(73) Assignee: Jessem Products Ltd., Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/378,891

(22) Filed: Mar. 5, 2003

(65) Prior Publication Data

US 2003/0136016 A1 Jul. 24, 2003

Related U.S. Application Data

(63) Continuation of application No. 09/627,241, filed on Jul. 27, 2000, now Pat. No. 6,550,154.

(30) Foreign Application Priority Data

Jul. 27, 1999 (CA) .............................................. 2278869

(51) Int. Cl.[7] ......................... B23B 49/00; B27C 5/02; B27C 5/04; B23C 1/00
(52) U.S. Cl. ...................... 33/638; 33/642; 144/136.95; 144/154.5
(58) Field of Search ..................... 33/638, 613, 626, 33/628, 642, 1 PT, 1 N; 144/136.95, 154.5; 409/182

(56) References Cited

U.S. PATENT DOCUMENTS

| | | | |
|---|---|---|---|
| 1,668,061 A | | 5/1928 | Falkins |
| 2,038,810 A | | 4/1936 | Tautz |
| 3,345,893 A | * | 10/1967 | Holdridge .................... 33/628 |
| 3,368,596 A | | 2/1968 | Comer |
| 3,386,482 A | | 6/1968 | Nadeau |
| 3,465,793 A | | 9/1969 | Zuk |
| 4,077,161 A | | 3/1978 | Wyle et al. |
| 4,249,442 A | | 2/1981 | Fittery |
| 4,281,694 A | * | 8/1981 | Gorman .................. 144/134 D |
| 4,465,114 A | * | 8/1984 | Schumacher ............ 144/286 R |
| 4,484,608 A | * | 11/1984 | Ferdinand et al. ....... 144/134 B |
| 4,597,185 A | * | 7/1986 | Ury .......................... 33/185 R |
| 4,599,927 A | | 7/1986 | Eccardt et al. |
| 4,660,288 A | * | 4/1987 | Dangschat ..................... 33/1 L |
| 4,679,606 A | * | 7/1987 | Bassett .................... 144/134 A |
| 4,738,571 A | * | 4/1988 | Olson et al. ................. 409/137 |
| 4,817,693 A | * | 4/1989 | Schuler ....................... 144/359 |
| 4,884,604 A | * | 12/1989 | Rice et al. ..................... 144/84 |
| 5,016,358 A | * | 5/1991 | Rice et al. .................... 33/569 |
| 5,040,580 A | * | 8/1991 | Hufford ................. 144/144 R |
| 5,042,542 A | * | 8/1991 | Purviance .............. 144/134 A |
| 5,052,119 A | * | 10/1991 | Eventoff ....................... 33/569 |
| 5,139,061 A | | 8/1992 | Neilson |
| 5,304,004 A | | 4/1994 | Nunes ......................... 374/208 |
| 5,429,162 A | * | 7/1995 | Bonnett ................... 144/251 A |
| 5,431,206 A | | 7/1995 | McAllister .............. 144/286 R |
| 5,579,672 A | * | 12/1996 | Findlay ......................... 83/468 |
| 5,694,994 A | * | 12/1997 | Engler, III et al. ...... 144/286.1 |
| 6,009,782 A | | 1/2000 | Tajima et al. |
| 6,203,255 B1 | * | 3/2001 | Broussard .................. 409/226 |
| 6,240,987 B1 | * | 6/2001 | Birkeland ................ 144/286.1 |
| 6,374,878 B1 | | 4/2002 | Masley et al. ............. 144/48.6 |
| D457,176 S | * | 5/2002 | Daniels et al. ............. D15/127 |
| 6,505,659 B1 | | 1/2003 | Hummel |
| 2002/0189713 A1 | | 12/2002 | Fontaine |

FOREIGN PATENT DOCUMENTS

| FR | 582743 | 12/1924 |
|---|---|---|

\* cited by examiner

*Primary Examiner*—G. Verbitsky
(74) *Attorney, Agent, or Firm*—Birch, Stewart, Kolasch & Birch, LLP

(57) ABSTRACT

The level-adjusting apparatus adjusts the level of a tool such as a router having a bit for cutting a piece of work on a working surface. The apparatus has a carriage on which the router is mounted. The carriage is located beneath the working surface and its bit projects above the surface. The carriage may be raised and lowered by means of a handle above the working surface. The handle is removable so that once the router is in position the handle may be removed so that it does not interfere with the routing operation.

34 Claims, 8 Drawing Sheets

LEVEL ADJUSTING APPARATUS FOR A POWER TOOL

This application is a continuation of application Ser. No. 09/627,241, filed on Jul. 27, 2000, now U.S. Pat. No. 6,550,154, the entire contents of which are hereby incorporated by reference and for which priority is claimed under 35 U.S.C. 120; and this application claims priority of Application No. 2,278,869, filed in Canada on Jul. 27, 1999 under 35 U.S.C. 119.

BACKGROUND OF THE INVENTION

This invention relates to an apparatus for selectively raising and lowering a power tool. More particularly the invention relates to an apparatus for adjusting the level of an electrical tool located beneath a work bench.

Power tools such as saws and routers are commonly mounted beneath the top or working surface of a work bench. The blade of the saw or the bit of the router projects through an opening in the working surface and cuts the work piece which rests on the working surface.

The depth of cut is adjusted by raising or lowering the saw or router. The mechanism for making the adjustment is conventionally attached to the saw or router so that the operator of the machine must crouch down to make the adjustment. Usually the operator must repeatedly do so in order to adjust the depth accurately. For example, he will check the depth from above the table, crouch down to adjust the tool, then stand up to check the depth again and so on. He can spend a considerable amount of time and energy in doing so.

SUMMARY OF THE INVENTION

It has been found that the level of a power tool such as a saw or router can be adjusted by means of an apparatus which is beneath a table top for protection from saw dust, wood chips, nails and the like but which is manipulated by means of a handle which fits into an aperture on the table top. The operator can manipulate the handle from above the table; he need not stoop down or otherwise change his position while he is making the adjustment.

After the adjustment is made, the operator can remove the handle so that it does not hinder the sawing or routing operation. Any debris which falls into the aperture from which the handle was removed falls harmlessly to the ground and not onto the apparatus for making the adjustment.

Broadly, the level-adjusting apparatus of the invention serves to adjust the level of a tool having an implement for cutting a piece of work. The apparatus includes: a working surface on which a piece of work to be cut is placed and a carriage beneath the working surface for supporting the tool such that its cutting implement projects above the working surface. A tube extends downwardly from the working surface and has an inner wall which defines a longitudinally extending space. A rotary element in the form of a tube is open at its top such that its space communicates with an aperture formed in the working surface and is open at its bottom such that particulate material which falls into the aperture falls downwardly through the space and exits through the open bottom of the tube. A spindle is operatively connected to the carriage such that rotation of the spindle causes a change in elevation of the carriage. The spindle is spaced from the tube sufficiently such that the particulate material which discharges from the tube does not fall on the spindle. There is means for operatively interconnecting the tube with the spindle such that rotation of the tube causes a like rotation of the spindle. A handle has a stem which is removably received in the aperture and in the space of the tube and when therein, contacts the inner wall of the tube such that rotation of the handle causes a like rotation of the tube and a like rotation of the spindle with resulting raising or lowering of the carriage.

DESCRIPTION OF THE DRAWINGS

The level-adjusting apparatus of the invention is described with reference to the accompanying drawings in which.

Like reference characters refer to like parts throughout the description of the drawings.

DESCRIPTION OF THE PREFERRED EMBODIMENTS

Figure 1:
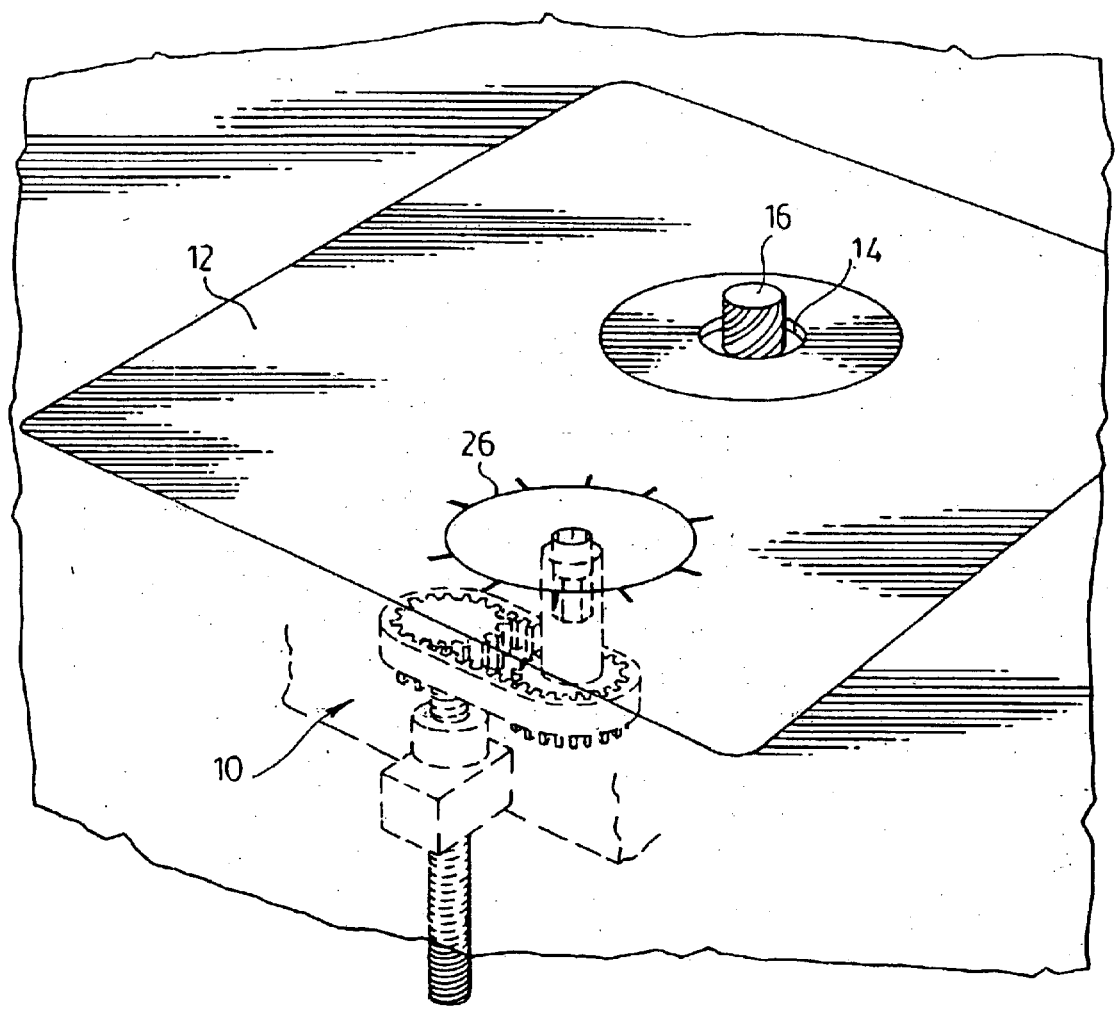
FIG. 1 is a perspective view of the upper portion of the apparatus, in conjunction with a router.
Figure 2:
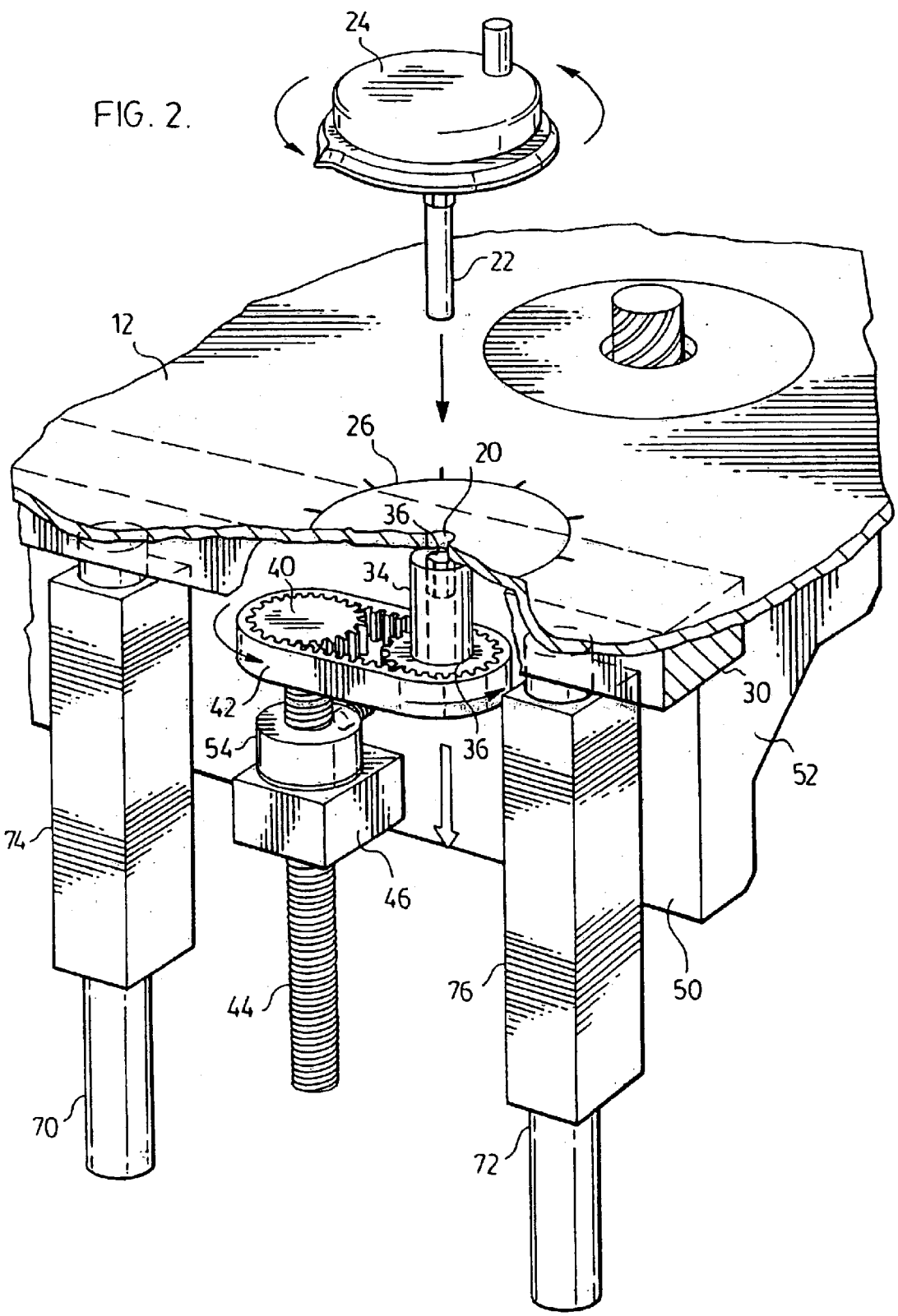
FIG. 2 is perspective view of the means for altering the level of the carriage on which a router is mounted, partly cut away, in conjunction with the bit of the router.

With reference to FIGS. 1 and 2, the apparatus of the invention, generally 10, includes a plate or working surface 12 on which a piece of work (not illustrated) is placed. The plate has an aperture 14 through which the bit 16 of a router 18 (FIGS. 4 and 5) extends. As is well known, the bit constitutes the cutting implement of the tool and serves to form the grooves, patterns and the like in a work piece.

The plate has a second aperture 20 through which the stem 22 of a handle 24 extends and that aperture is surrounded by a circular scale 26 etched or painted onto the upper surface of the plate.

Figure 3:
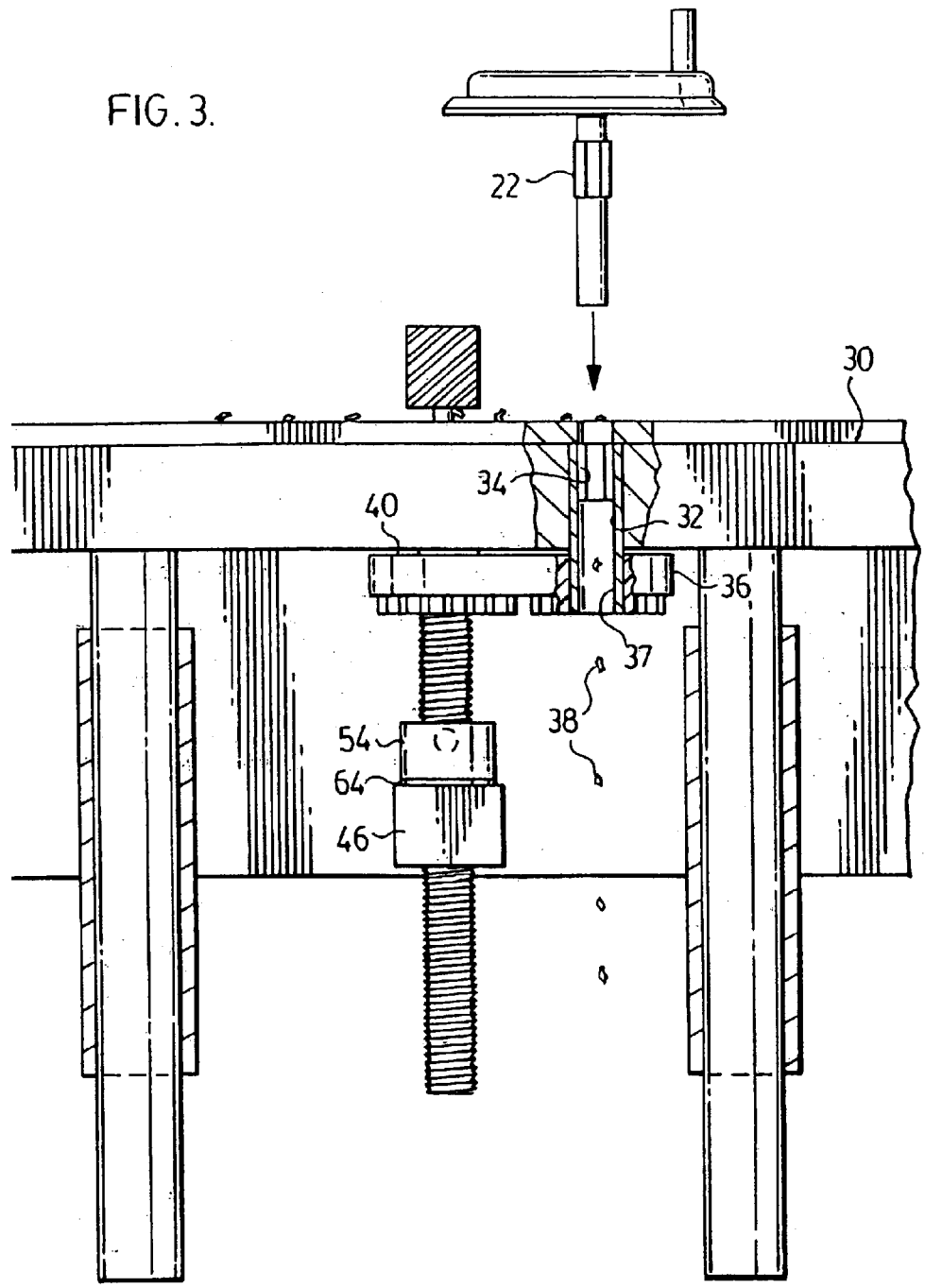
FIG. 3 is an elevation of the apparatus illustrated in FIG. 2.

With reference to FIGS. 2 and 3, a bar 30 is attached to the lower wall of the plate. A cylindrical opening 32 is formed in the bar and extends downwardly from aperture 20 and terminates at the lower wall of the bar.

A rotary element or tube 34 is received in the opening and is free to rotate therein. A gear wheel 36 is keyed to the lower portion of the outer wall of the tube. The tube forms the hub of the gear wheel. The tube has a hollow longitudinally extending central space or opening defined by a hexagonal inner wall 37. The tube is open at the bottom and the top.

Stem 22 of the handle has a hexagonal outer wall which conforms in shape to that of the inner wall of the tube so that when the stem is inserted through aperture 20 and into the tube, the stem locks to the tube. As a result, when the stem rotate so too does the tube. Thus rotation of handle 24 causes a like rotation of gear wheel 36. There is however play between the stem and the tube so that the stem can be freely inserted and withdrawn from the tube.

As illustrated in FIG. 3, when the stem is not in the tube, the space beneath aperture 20 is clear of obstruction. The central opening of the tube is directly beneath the aperture so that any saw dust which falls into the aperture will fall through the opening and to the floor as at 38. Since the tube forms the hub of gear wheel 36, the saw dust will not interfere with the operation of the gear wheel.

A second gear wheel 40 is spaced horizontally from gear wheel 36. The two wheels are interconnected by a belt 42 having teeth on its inner wall which mate with the teeth of the two gear wheels. The second or driven gear wheel 40 is affixed or splined to a threaded spindle 44. The spindle is threadably received in a block 46 which is affixed to the vertical wall 50 of a carriage 52 for the router.

The two gear wheels 36, 40 serve as the means for operatively interconnecting the tube 34 to the spindle 44. The spindle, it will be noted, is spaced from tube 34 sufficiently that saw dust and other small particulate material which falls from the tube does not fall onto the spindle and hence does not interfere with its operation.

Figure 4:
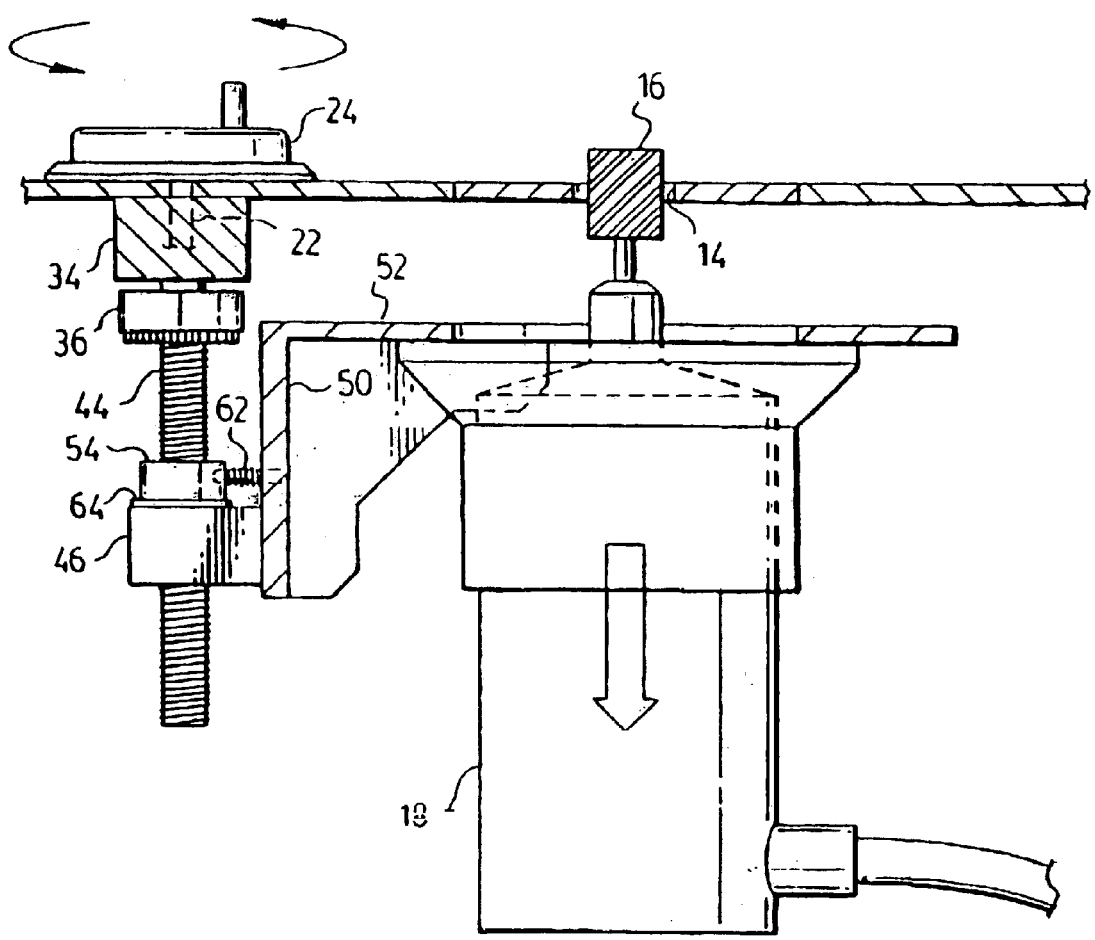
FIG. 4 is an elevation of the apparatus showing the manner in which it lowers a router.
Figure 6:
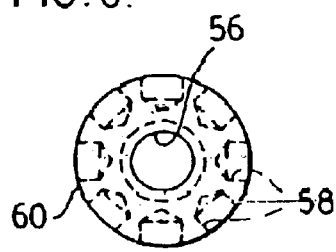
FIG. 6 is a top view of a collar of the apparatus.

With reference to FIGS. 2, 4 and 6, a collar 54 has a threaded central opening 56 through which the spindle extends. A number of radially extending threaded openings 58 are formed on outer wall 60 of the collar. Each opening is adapted to receive the end of screw 62 which extends through a threaded opening in the vertical wall. The purpose of the collar is described below.

Resilient means in the form of a coil spring or a rubber washer 64 is interposed between the collar and the threaded block 46.

A pair of vertical guide rods 70, 72 is affixed to bar 30 and extend downwardly from it. The bars are slidingly received in elongated cylindrical openings formed in a pair of sleeves 74, 76. The sleeves are affixed to vertical wall 50. The rods and sleeves cooperate to guide the carriage as it moves upwardly and downwardly relative to plate 12.

Figure 8:
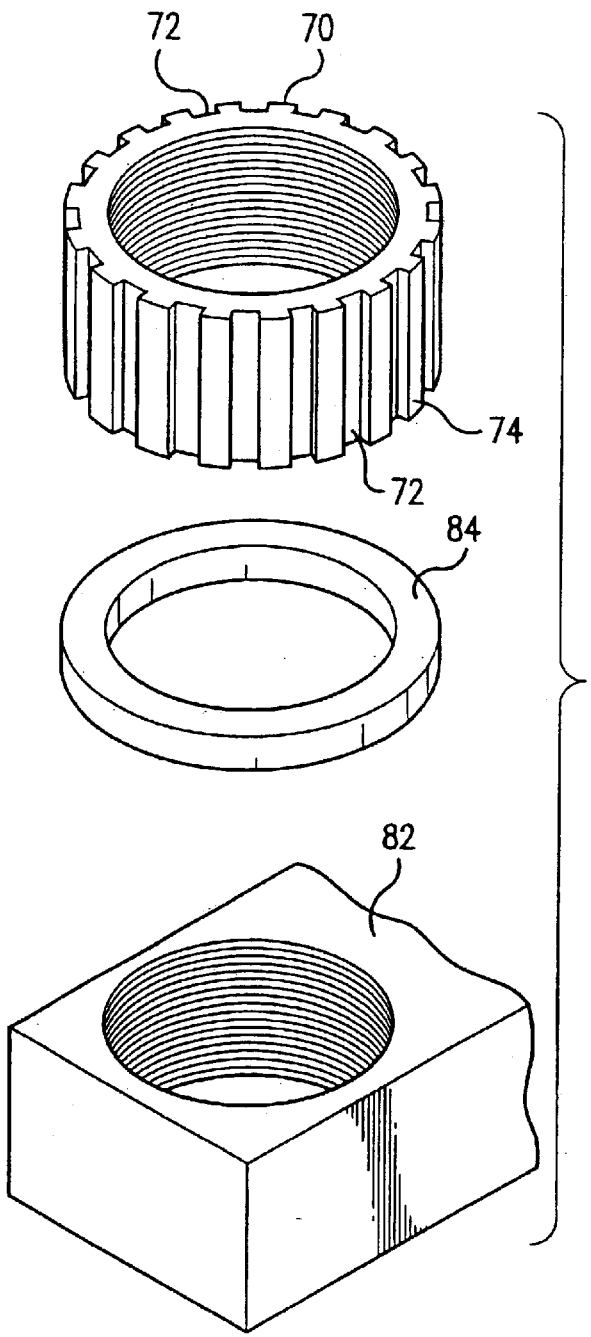
FIG. 8 is a perspective view of a second embodiment of the collar in conjunction with a washer and a block.
Figure 9:
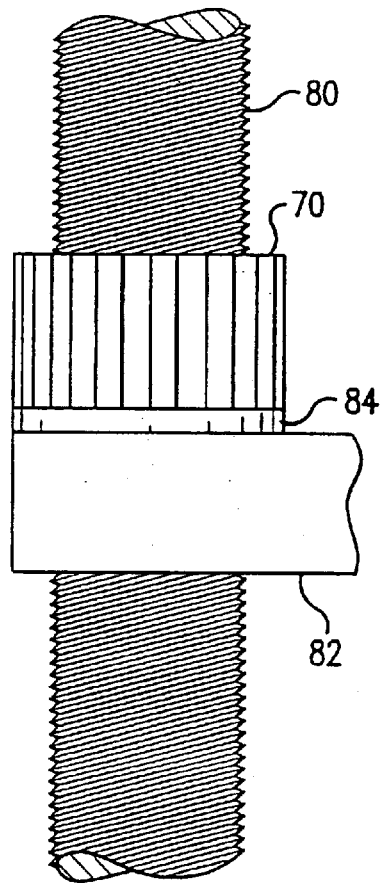
FIG. 9 is an elevation of the components of FIG. 8 shown connected to a spindle.

With reference to FIGS. 8 and 9, collar 70 has a toothed outer wall formed by a plurality of longitudinally extending parallel grooves 72 arrayed along the entire outer wall. The grooves are spaced apart by ribs 74. The collar has threads 76 formed on its inner wall and those threads mate with threads 78 formed on the outer wall of spindle 80.

Figure 10:
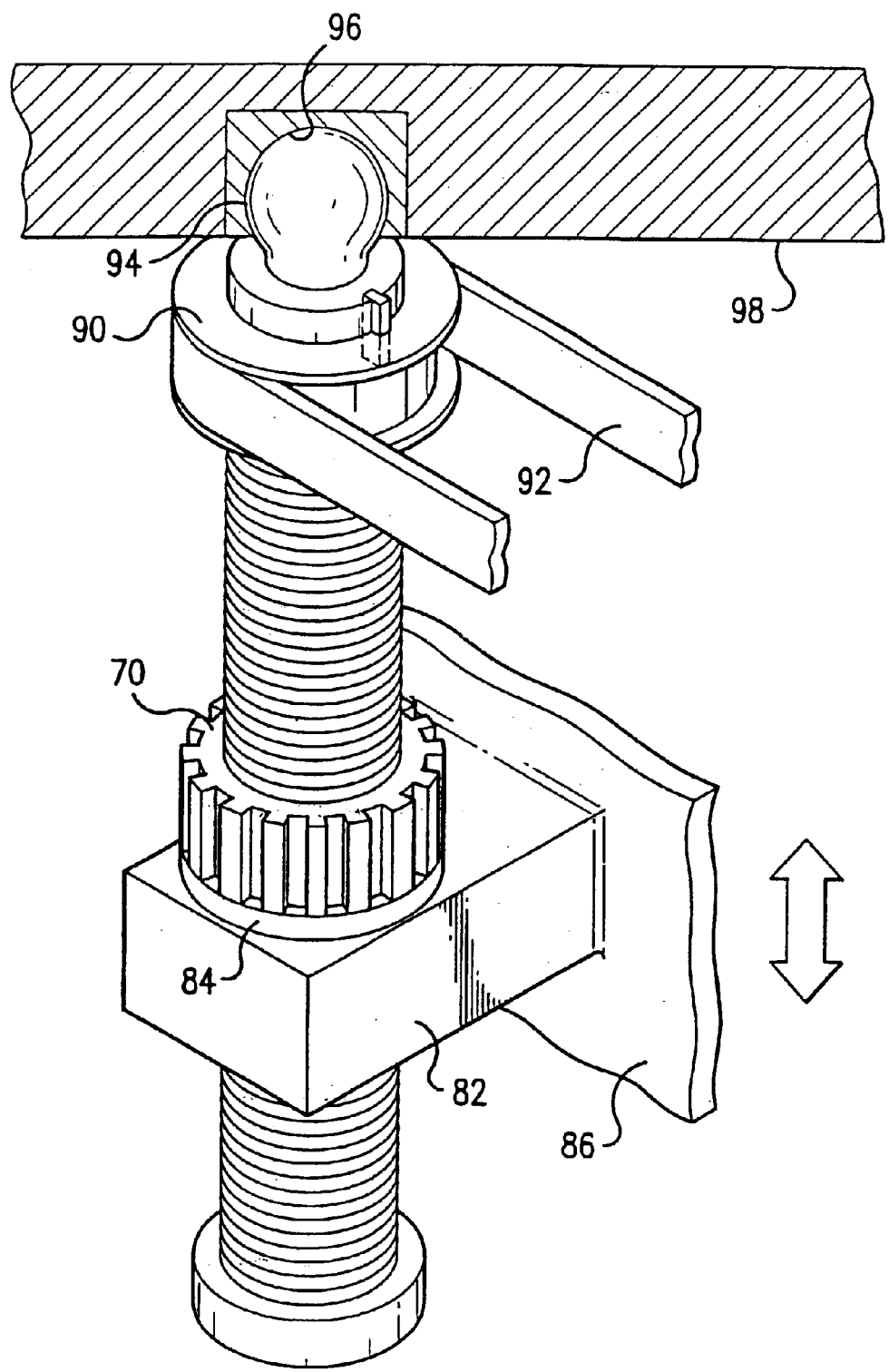
FIG. 10 is a perspective view of the components of FIG. 9 in conjunction with the apparatus for causing the spindle to rotate.

With reference to FIG. 10, collar 70 is disposed on the spindle above block 82 and a resilient washer 84 separates the collar from the block. The block is attached to the vertical wall 86 of the carriage in the same way as block 46 illustrated in the previous drawings is attached to the carriage.

A sheave 90 is splined to the spindle and a belt 92 is trained around the groove in the sleeve. The sheave and belt serve the same function as gear wheel 40 and belt 42 illustrated in FIGS. 1–3.

A ball 94 is affixed to the upper end of the spindle and the ball is received in a socket 96 formed in bar 98 beneath the working surface of the assembly.

Figure 5:
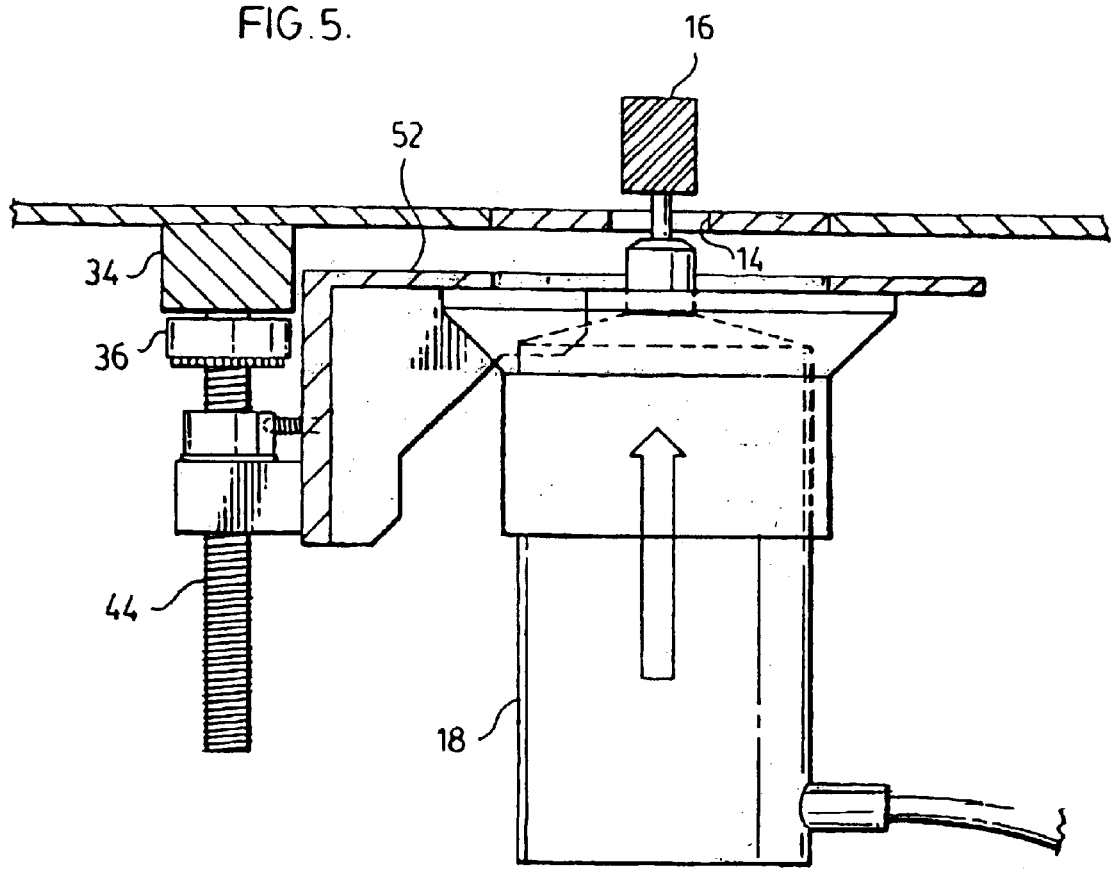
FIG. 5 is an elevation of the apparatus showing the manner in which it raises a router.
Figure 7:
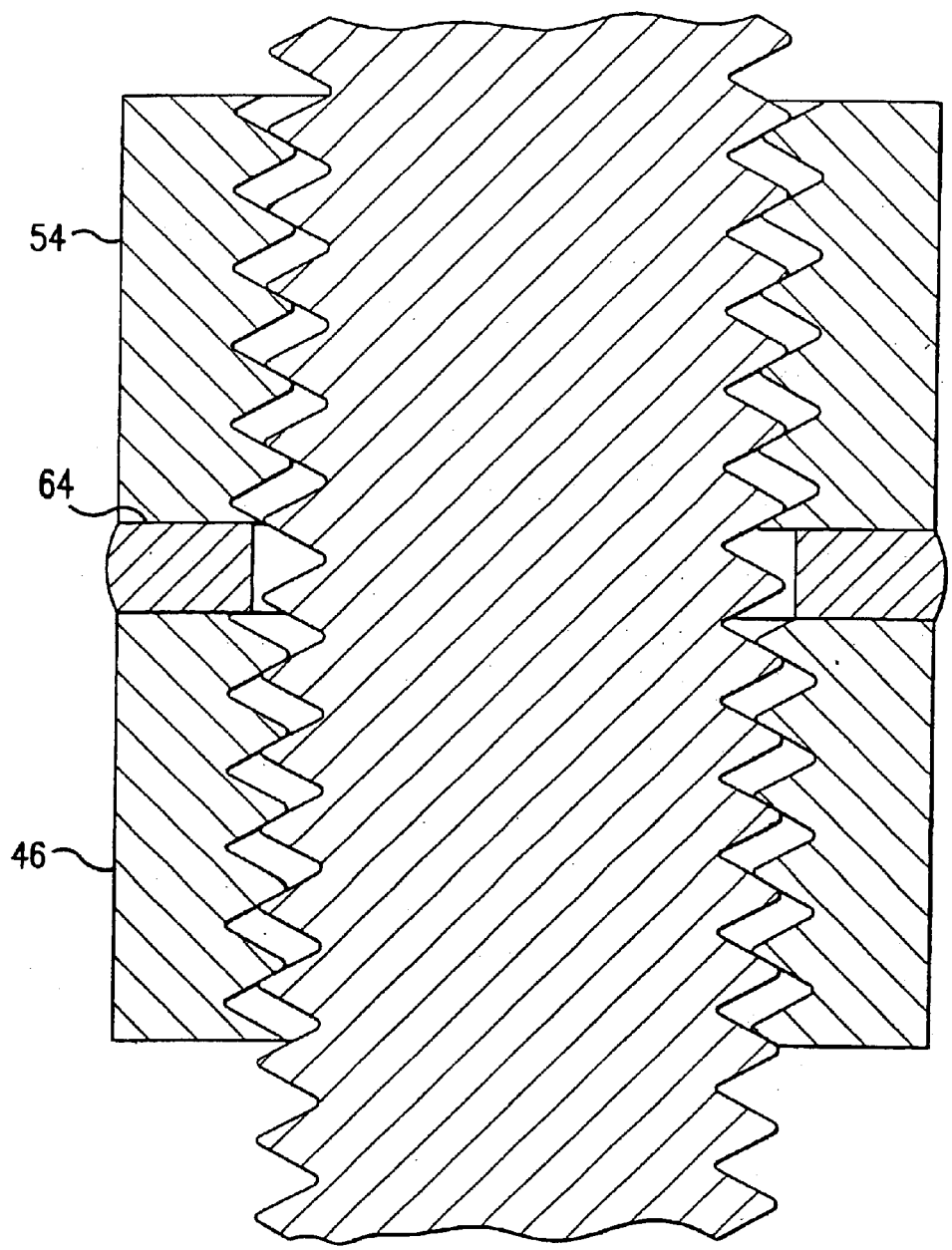
FIG. 7 is an enlarged elevation of the collar in conjunction with a spindle and block of the apparatus.

The operation of the level-adjusting apparatus is described with reference to FIGS. 4, 5 and 7. With reference first to FIG. 4, rotation of handle 24 causes a like rotation of tube 34 within which stem 22 is located. As tube 34 rotates so too does gear wheel 36. The latter wheel drives gear wheel 40 which in turn causes spindle 44 to rotate. The spindle causes block 46 to move vertically downward with resulting like movement of the carriage 52 to which router 18 is attached. Guide rods 70, 72 ensure that the movement of the carriage is linear and not rotary.

As the router descends, bit 16 withdraws from aperture 14. FIG. 5 shows the effect of rotation of the handle in the opposite direction.

Should there be slippage between the spindle and block 46, screw 62 is disengaged from the collar 54 and the collar is rotated to advance it toward block 46. Such advance will compress the spring or washer 64 which in turn will apply an opposite or counter upward pressure against the collar. Such pressure will force the threads of the collar against the threads of the spindle as illustrated in FIG. 7 and friction between the two will prevent further slippage. Screw 62 is then tightened into whichever opening 58 in the collar faces the screw to lock the collar in this position and to prevent it from further rotation.

With reference to FIGS. 8–10, the operation of collar 70 is the same as that of collar 54. The collar is prevented from rotating by means for a screw similar to screw 62 of FIG. 4. The forward end of the screw fits into any one of grooves 72 and when therein prevents the collar from turning.

As indicated previously, the spring or washer resiliently biases the collar upward when it is tightened against the spring or washer. Such pressure takes up any clearance between the threads of the spindle and the collar and prevents any vertical play between the two components. Such pressure also prevents the spindle from rotating.

The collar thus serves to lock the carriage in position and prevents upward or downward movement of the carriage on which the router is mounted. Screw 62 serves as stop means to prevent the collar from rotating on the spindle once it is in the desired position.

While the drawings show a router connected to the level-adjusting apparatus of the invention it will be understood that other tools such as a power saw may also be connected to the carriage with useful results.

It will also be understood that other modifications can be made in the preferred embodiments illustrated and described herein without departing from the scope and purview of the invention as described herein.

I claim:

1. A level-adjusting apparatus for adjusting the level of a tool having an implement for cutting a piece of work on a working surface, said level adjusting apparatus comprising:
   (i) a carriage mounted beneath said working surface and adapted to support the tool such that said cutting implement may project through and above said working surface, said cutting implement having an axis of rotation;
   (ii) a pair of guide rods which extend downwardly from said working surface and which slidingly supports said carriage for displacement toward and away from said working surface, said rods having longitudinal axes which are parallel to each other and to the axis of rotation of said tool;
   (iii) a spindle threadably mounted to said carriage for altering the level of said carriage, said spindle being spaced apart from said guide rods; and
   (iv) a handle extending upwardly from said working surface and operatively connected to and activating said spindle.

2. The apparatus of claim 1 wherein both said carriage and said spindle have threads which mate with and cooperate with each other such that only when said spindle rotates does said tool move relative to said working surface.

3. The apparatus of claim 1 wherein both said carriage and said spindle have threads which mate with and cooperate with each other to prevent said carriage from moving relative to said working surface unless said spindle rotates.

4. The apparatus of claim 1 wherein said spindle has a longitudinal axis which is parallel to and is spaced equidistantly from the axes of said guide rods.

5. The apparatus of claim 1 including means for removably mounting said tool to said carriage.

6. The apparatus of claim 1 wherein said handle is removably mounted upon said working surface.

7. The apparatus of claim 1 further including a pair of sleeves affixed to said carriage and having upper and lower ends in which openings are formed, each said guide rod extending through the opening at the upper end of a separate said sleeve and extending outwardly from the opening at the lower end of said separate sleeve.

8. The apparatus of claim 1 wherein said spindle is threadably mounted to said working surface.

9. The apparatus of claim 1 wherein the axes of said guide rods are spaced equidistantly from the axis of rotation of said tool.

10. The apparatus of claim 9 further including means for preventing the threads of said spindle from moving relative to those of a threaded block on said carriage.

11. A level-adjusting apparatus for adjusting the level of a tool having an implement for cutting a piece of work on a working surface and in which an opening is formed, said opening having an axis, said level adjusting apparatus comprising:
  (i) a carriage mounted beneath said working surface and adapted to support said cutting implement such that said cutting implement may project through said opening and above said working surface;
  (ii) a pair of guide rods which extend downwardly from said working surface and which slidingly supports said carriage for displacement toward and away from said working surface, said rods having longitudinal axes which are parallel to each other and to the axis of said opening;
  (iii) a spindle threadably mounted to said carriage for altering the level of said carriage; and
  (iv) a handle extending upwardly from said working surface and operatively connected to and activating said spindle.

12. The apparatus of claim 11 wherein the axes of said guide rods are spaced equidistantly from the axis of said opening.

13. The apparatus of claim 11 further including a pair of sleeves affixed to said carriage and having upper and lower ends in which openings are formed, each said guide rod extending through the opening at the upper end of a separate said sleeve and extending outwardly from the opening at the lower end of said separate sleeve.

14. A level-adjusting apparatus for adjusting the level of a tool having an implement for cutting a piece of work on a working surface, said level adjusting apparatus comprising:
  (i) a carriage mounted beneath said working surface and adapted to support said tool such that said cutting implement may project above said working surface, said carriage having a threaded block immovable relative thereto such that movement of said carriage results in a like movement of said block;
  (ii) means for altering the level of said carriage including a spindle having threads which mate with the threads of said block such the rotation of said spindle in one direction causes said carriage to ascend toward said working surface and rotation of said spindle in the opposite direction caused the carriage to descend away from said working surface; and
  (iii) a handle extending upwardly from said working surface and operatively connected to said spindle for causing said spindle to rotate with resulting alternation in the level of said carriage.

15. A level-adjusting apparatus for adjusting the level of a tool having an implement for cutting a piece of work on a working surface, said level adjusting apparatus comprising:
  (i) a carriage mounted beneath said working surface and adapted to support said tool such that said cutting implement may project above said working surface, said carriage having a threaded block immovable relative thereto such that movement of said carnage results in a like movement of said block;
  (ii) means for altering the level of said carriage including a spindle having threads which mate with the threads of said block such that rotation of said spindle in one direction causes said carnage to ascend toward said working surface and rotation of said spindle in the opposite direction causes the carriage to descend away from said working surface, said threads of said spindle and said block remaining in contact with each other throughout the ascent and descent of said carriage; and
  (iii) a handle extending upwardly from said working surface and operatively connected to said spindle for causing said spindle to rotate with resulting alteration in the level of said carriage.

16. The apparatus of claim 15 further including means for selectively causing the threads of said spindle and block to press against each other to prevent slippage therebetween through the ascent and descent of said carriage.

17. A level-adjusting apparatus for adjusting the level of a router having an implement for cutting a piece of work on a working surface, said level adjusting apparatus comprising:
  (i) a carriage mounted beneath said working surface and adapted to support the router such that said cutting implement may project through and above said working surface, said cutting implement having an axis of rotation;
  (ii) a pair of guide rods which extend downwardly from said working surface and which slidingly supports said carriage for displacement toward and away from said working surface, said rods having longitudinal axes which are parallel to each other and to the axis of rotation of said router;
  (iii) a spindle threadably mounted to said carriage for altering the level of said carriage, said spindle being spaced apart from said guide rods; and
  (iv) a handle extending upwardly from said working surface and operatively connected to and activating said spindle.

18. The apparatus of claim 17 wherein the axes of said guide rods are spaced equidistantly from the axis of rotation of said router.

19. The apparatus of claim 18 further including means for preventing the threads of said spindle from moving relative to those of said block.

20. The apparatus of claim 17 wherein said handle is removably mounted upon said working surface.

21. The apparatus of claim 17 including means for removably mounting said router to said carriage.

22. The apparatus of claim 17 wherein said spindle has a longitudinal axis which is parallel to and is spaced equidistantly from the axes of said guide rods.

23. The apparatus of claim 17 wherein both said carriage and said spindle have threads which mate with and cooperate with each other to prevent said carriage from moving relative to said working surface unless said spindle rotates.

24. The apparatus of claim 17 wherein both said carriage and said spindle have threads which mate with and cooperate with each other such that only when said spindle rotates does said router move relative to said working surface.

25. The apparatus of claim 17 further including a scale on said working surface adjacent to said handle for indicating the level of said carriage relative to said working surface.

26. The apparatus of claim 17 wherein said spindle is threadably mounting to said working surface.

27. The apparatus of claim 17 further including a pair of sleeves affixed to said carriage and having upper and lower ends in which openings are formed, each said guide rod extending through the opening at the upper end of a separate said sleeve and extending outwardly from the opening at the lower end of said separate sleeve.

28. A level-adjusting apparatus for adjusting the level of a router having an implement for cutting a piece of work on a working surface and in which an opening is formed, said opening having an axis, said level adjusting apparatus comprising:
   (i) a carriage mounted beneath said working surface and adapted to support said cutting implement such that said implement may project through said opening and above said working surface;
   (ii) a pair of guide rods which extend downwardly from said working surface and which slidingly supports said carriage for displacement toward and away from said working surface, said rods having longitudinal axes which are parallel to each other and to the axis of said opening;
   (iii) a spindle threadably mounted to said carriage for altering the level of said carriage; and
   (iv) a handle extending upwardly from said working surface and operatively connected to and activating said spindle.

29. The apparatus of claim 28 wherein the axes of said guide rods are spaced equidistantly from the axis of said opening.

30. The apparatus of claim 28 further including a pair of sleeves affixed to said carriage and having upper and lower ends in which openings are formed, each said guide rod extending through the opening at the upper end of a separate said sleeve and extending outwardly from the opening at the lower end of said separate sleeve.

31. A level-adjusting apparatus for adjusting the level of a router having an implement for cutting a piece of work on a working surface, said level adjusting apparatus comprising:
   (i) a carriage mounted beneath said working surface and adapted to support said router such that said cutting implement may project above said working surface, said carriage having a threaded block immovable relative thereto such that movement of said carriage results in a like movement of said block;
   (ii) means for altering the level of said carriage including a spindle having threads which mate with the threads of said block such that rotation of said spindle in one direction causes said carriage to ascend toward said working surface and rotation of said spindle in the opposite direction causes the carriage to descend away from said working surface; and
   (iii) a handle extending upwardly from said working surface and operatively connected to said spindle for causing said spindle to rotate with resulting alteration in the level of said carriage.

32. A level-adjusting apparatus for adjusting the level of a router having an implement for cuffing a piece of work on a working surface, said level adjusting apparatus comprising:
   (i) a carriage mounted beneath said working surface and adapted to support said router such that said cutting implement may project above said working surface, said carriage having a threaded block immovable relative thereto such that movement of said carriage results in a like movement of said block;
   (ii) means for altering the level of said carriage including a spindle having threads which mate with the threads of said block such that rotation of said spindle in one direction causes said carriage to ascend toward said working surface and rotation of said spindle in the opposite direction causes the carriage to descend away from said working surface, said threads of said spindle and said block remaining in contact with each other throughout the ascent and descent of said carriage; and
   (iii) a handle extending upwardly from said working surface and operatively connected to said spindle for causing said spindle to rotate with resulting alteration in the level of said carnage.

33. The apparatus of claim 32 further including means for selectively causing the threads of said spindle and block to press against each other to prevent slippage therebetween throughout the ascent and descent of said carriage.

34. A level-adjusting apparatus for adjusting the level of a tool having an implement for cutting a piece of work on a working surface, said level adjusting apparatus comprising:
   (i) a carriage mounted beneath said working surface and adapted to support the tool such that said cutting implement may project through and above said working surface, said cutting implement having an axis of rotation;
   (ii) a pair of guide rods which extend downwardly from said working surface and which slidingly supports said carriage for displacement toward and away from said working surface, said rods having longitudinal axes which are parallel to each other and to the axis of rotation of said tool;
   (iii) a spindle threadably mounted to said carriage for altering the level of said carriage, said spindle being spaced apart form said guide rods; and
   (iv) a handle extending upwardly from said working surface and operatively connected to and activating said spindle,
   and further including a scale on said working surface adjacent to said handle for indicating the level of said carriage relative to said working surface.

\* \* \* \* \*